(12) United States Patent
Gopikanth

(10) Patent No.: US 6,799,038 B2
(45) Date of Patent: Sep. 28, 2004

(54) METHOD AND APPARATUS FOR WIRELESS NETWORK SELECTION

(75) Inventor: Venkat Gopikanth, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 182 days.

(21) Appl. No.: 10/042,897

(22) Filed: Jan. 9, 2002

(65) Prior Publication Data

US 2003/0129971 A1 Jul. 10, 2003

(51) Int. Cl.$^7$ .................................................. H04Q 7/20
(52) U.S. Cl. ........................... 455/435.2; 455/414.1; 455/435.1; 455/436
(58) Field of Search ........................... 455/436, 437, 455/438, 552.1, 414.1, 435.1, 435.2, 450, 451, 452.1, 524, 553.1

(56) References Cited

U.S. PATENT DOCUMENTS

| | | | | |
|---|---|---|---|---|
| 6,148,197 A | * | 11/2000 | Bridges et al. | 455/432.3 |
| 6,178,327 B1 | * | 1/2001 | Gomez | 455/445 |
| 6,363,252 B1 | * | 3/2002 | Hamalainen et al. | 455/436 |
| 6,510,146 B1 | * | 1/2003 | Korpela et al. | 370/332 |
| 6,546,251 B1 | * | 4/2003 | Dalsgaard et al. | 455/437 |
| 6,591,103 B1 | * | 7/2003 | Dunn et al. | 455/436 |
| 2003/0114158 A1 | * | 6/2003 | Soderbacka et al. | 455/436 |

FOREIGN PATENT DOCUMENTS

| | | | | |
|---|---|---|---|---|
| EP | 0877533 A2 | * | 1/1998 | H04Q/7/38 |
| EP | 0 877 533 A2 | | 11/1998 | |
| WO | WO-9628947 | * | 9/1996 | H04Q/7/38 |
| WO | WO-01/35585 A1 | | 5/2001 | |
| WO | WO01/35585 | * | 5/2001 | H04L/12/56 |

OTHER PUBLICATIONS

International Search Report for Application No. PCT/US02/41761 dated Jun. 5, 2003.

* cited by examiner

*Primary Examiner*—William Trost
*Assistant Examiner*—Stephen M. D'Agosta
(74) *Attorney, Agent, or Firm*—Marshall, Gerstein & Borun LLP

(57) ABSTRACT

A method of selecting a wireless communication network, where each wireless communication network has one or more base transceiver stations. The method includes receiving a first signal from a first base transceiver station of a first wireless communication network. The first signal is indicative of one or more communication service types offered by the first wireless communication network. The method further includes receiving a second signal from a second base transceiver station of a second wireless communication network. The second signal is indicative of one or more communication service types offered by the second wireless communication network. One of the first and second wireless communication networks is selected based at least in part on the first and second signals.

15 Claims, 3 Drawing Sheets

| | RESERVED | NO GUARANTEED BW | NON-GUARANTEED BW ≥ 56Kbps | GUARANTEED BW ≥ 56Kbps | NON-GUARANTEED BW ≥ 384Kbps | GUARANTEED BW ≥ 384Kbps | NON-GUARANTEED BW ≥ 1Mbps | GUARANTEED BW ≥ 1Mbps | |
|---|---|---|---|---|---|---|---|---|---|
| PLMN 202 | 1 | 0 | 1 | 1 | 1 | 1 | 1 | 0 | ─302 |
| PLMN 204 | 1 | 1 | 1 | 0 | 1 | 0 | 0 | 0 | ─304 |
| PLMN 206 | 1 | 0 | 1 | 1 | 0 | 0 | 0 | 0 | ─306 |
| MOBILE STATION | 1 | 0 | 0 | 0 | 0 | 1 | 0 | 1 | ─310 |

|  | RESERVED | NO GUARANTEED BW | NON-GUARANTEED BW ≥ 56Kbps | GUARANTEED BW ≥ 56Kbps | NON-GUARANTEED BW ≥ 384Kbps | GUARANTEED BW ≥ 384Kbps | NON-GUARANTEED BW ≥ 1Mbps | GUARANTEED BW ≥ 1Mbps |  |
|---|---|---|---|---|---|---|---|---|---|
| PLMN 202 | 1 | 0 | 1 | 1 | 1 | 1 | 1 | 0 | ─302 |
| PLMN 204 | 1 | 1 | 1 | 0 | 1 | 0 | 0 | 0 | ─304 |
| PLMN 206 | 1 | 0 | 1 | 1 | 0 | 0 | 0 | 0 | ─306 |
| MOBILE STATION | 1 | 0 | 0 | 0 | 0 | 1 | 0 | 1 | ─310 |

METHOD AND APPARATUS FOR WIRELESS NETWORK SELECTION

TECHNICAL FIELD

The present invention relates generally to communication systems, and more particularly to a method and apparatus for selection of a wireless communications network.

BACKGROUND OF THE ART

Mobile stations initiate Public Land Mobile Network (PLMN) discovery whenever they are powered on or move to a new registration area. The mobile station normally operates in its home PLMN (i.e., the PLMN normally associated with the subscriber's service provider). The home PLMN is known by matching the mobile country code (MCC) and the mobile network code (MNC) of the home PLMN with the MCC and MNC of the International Mobile Station Identifier (IMSI). If the mobile station is unable to initiate contact with the home PLMN, it must look for and contact a different PLMN, also known as a visited PLMN. Often this occurs in roaming situations when the mobile station travels into areas not covered by its provider or home PLMN.

Once a suitable PLMN is discovered, the mobile station searches for a suitable cell of the chosen PLMN to provide cellular service. The mobile station then tunes to the control channel of the chosen cell and may register its presence in the registration area of the chosen cell. When the mobile station initiates a communication session (e.g., a phone call), the mobile station accesses the network on the control channel of the chosen cell. The mobile station sometimes continues to search for a more suitable cell within the PLMN at regular intervals, which may occur if the mobile station loses coverage of the chosen cell (e.g., the mobile station moves out of range).

Sometimes, a given area may have more than one PLMN (i.e., PLMN areas overlap), thereby requiring the mobile station to choose one PLMN over another when the mobile station is powered on. In other cases, the mobile station may lose coverage of a chosen PLMN and must select another network providing service, such as in roaming situations. The selection of a particular PLMN may be done either automatically or manually. Automatic selection uses a prioritized list of PLMNs, where the mobile station chooses the highest listed PLMN that is available. Manual selection offers a list of available PLMNs to the subscriber, and the subscriber must select the PLMN.

Currently, the list of available PLMNs and their priority is determined based on whatever network offers the strongest signal or strongest radio frequency (RF). For example, if a provider of a first PLMN offers a stronger signal than a provider of a second PLMN, then the mobile station will place the first PLMN higher on the list than the second PLMN. If the mobile station uses automatic selection, then the first PLMN would be chosen automatically based on its signal strength.

If using a visited PLMN, the mobile station may continue to periodically search for its home PLMN. A fuller explanation of current PLMN selection may be found in "Universal Mobile Telecommunications System (UMTS) Non-Access-Stratum functions related to Mobile Station (MS) in idle mode," 3GPP TS 23.122, v.4.1.0, Release 4, European Telecommunications Standards Institute (2001), and in "Upper Layer (Layer 3) Signaling Standard for cdma2000 Spread Spectrum Systems," §2.6.1, pp. 2–33 to 2–43, TIA/EIA/IS-2000.5-A, Telecommunications Industry Association (March 2000).

With the deployment of third generation (3G) multimedia services, various PLMNs and providers will have different capabilities to cater to different needs of subscribers who require different types of communication services. For example, some high-end communication services (e.g., streaming video, Internet browsing, etc.), will require high bandwidth PLMNs, whereas more basic services (e.g., voice services, simple text messaging, etc.) may only require lower bandwidth PLMNs to communicate effectively. A particular service area may provide different communication services or different classes of service (e.g., different bandwidths, is guaranteed/nonguaranteed bandwidth, etc.) either on the same PLMN or among different PLMNs. For example, one PLMN may allow for both voice and video communication sessions each having different bandwidths requirements. Or one PLMN in an area may provide bandwidths dedicated to video services or other high-speed services, while another PLMN in the same area may provide bandwidths for only voice services or other basic services. The PLMN that is useful for video services may offer a communications bandwidth that is much greater than the communications bandwidth of the PLMN useful for voice services.

However, as mentioned above the current method of selecting a PLMN is based only on signal strength. Therefore, a mobile station that only needs a bandwidth for basic services may choose a PLMN that offers a high bandwidth if that PLMN offers the strongest signal. This results in inefficient use of bandwidth if the mobile station chooses that PLMN. Conversely, a mobile station that requires high bandwidth service may choose a PLMN that has a low bandwidth also because that PLMN offered the strongest signal. In this case, the mobile station cannot communicate effectively due to the bandwidth limitations of the PLMN.

Thus, there is a need for a method and apparatus that allows a mobile station to choose a PLMN that will meet the bandwidth needs of the mobile station while efficiently utilizing bandwidth resources.

DESCRIPTION OF THE PREFERRED EMBODIMENTS

A communication system in accordance with the present invention is described in terms of several preferred embodiments, and particularly, in terms of a wireless communication system operating in accordance with at least one of several standards. These standards include analog, digital or dual-mode communication system protocols such as, but not limited to, the Advanced Mobile Phone System (AMPS), the Narrowband Advanced Mobile Phone System (NAMPS), the Global System for Mobile Communications (GSM), the Enhanced Data-rate for GSM Evolution (EDGE), the General Packet Radio Service (GPRS), the Universal Mobile Telecommunications System (UMTS), Frequency Division Multiple Access (FDMA), the IS-55 Time Division Multiple Access (TDMA) digital cellular, the IS-136 TDMA digital cellular, the IS-95 Code Division Multiple Access (CDMA) digital cellular, demand assignment schemes (DA/TDMA, DA/CDMA, DA/FDMA), the Wideband Code Division Multiple Access (WCDMA), CDMA 2000, IMT-2000, the Personal Communications System (PCS), 3GPP, and variations and evolutions of these protocols. The communication system of the present invention is further directed to any communication network wherein a node requires certain network qualities, such as bandwidth. This may include local area networks (LAN), closed-loop networks, wireless LANs, etc.

Figure 1:
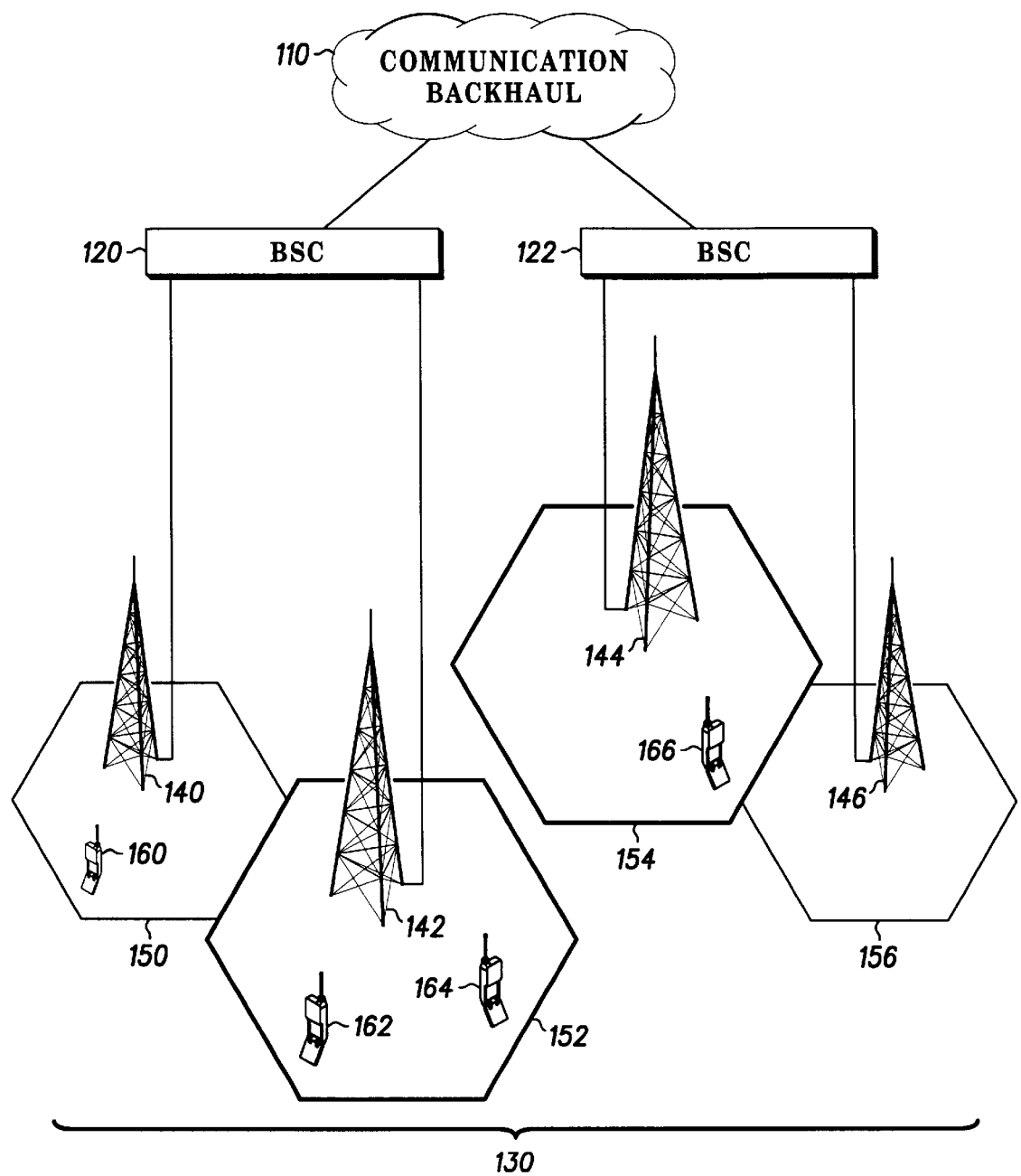
FIG. 1 is a block diagram representation of a wireless communication system that may be adapted to operate in accordance with the preferred embodiments of the present invention.

Referring to FIG. 1, a wireless communication system 100 includes a communication backhaul 110, a plurality of base station controllers (BSC), generally shown as 120 and 122, servicing a total service area 130. The BSCs generally handle signal (de)compression, handoff determinations, and the signal access determinations. The wireless communication system 100 may be, but is not limited to, a frequency division multiple access (FDMA) based communication system, a time division multiple access (TDMA) based communication system, and code division multiple access (CDMA) based communication system. As is known for such systems, each BSC 120 and 122 has associated therewith one or more base transceiver stations (BTS), generally shown as 140, 142, 144, and 146, servicing communication cells, generally shown as 150, 152, 154, and 156, within the total service area 130. For ease of explanation, BSCs and base transceiver stations will be discussed in relation to the invention. However, this should not be construed as limiting the invention to BSCs and base transceiver stations, as Radio Network Controllers (RNCs), Node B's and other complimentary technologies may also be utilized to implement the invention, as would be apparent to those skilled in the art. The BSCs 120 and 122, and base transceiver stations 140, 142, 144, and 146 are specified and operate in accordance with the applicable standard or standards for providing wireless communication services to mobile stations (MS), generally shown as 160, 162, 164, 166, and 168, operating in communication cells 150, 152, 154, and 156, and each of these elements are commercially available from Motorola, Inc. of Schaumburg, Ill.

Figures 2, 3:
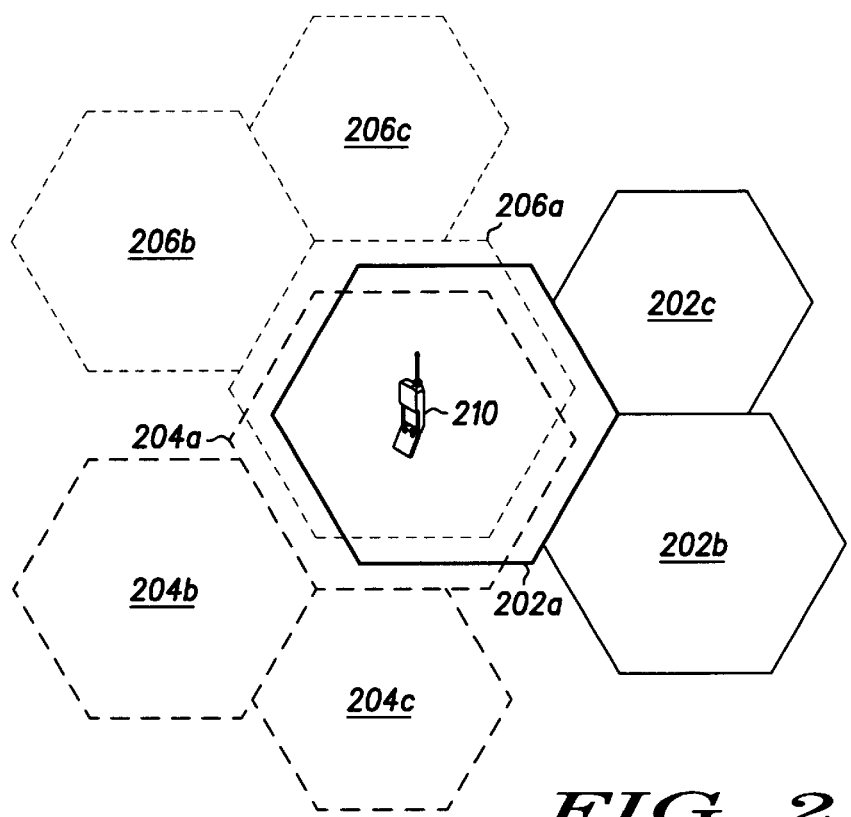
FIG. 2 is a block diagram representing multiple PLMNs having overlapping coverage areas.
FIG. 3 is a table of codes that may be used to define various classes-of-service in accordance with an embodiment of the invention.

Referring to FIG. 2, multiple PLMNs 202, 204, 206 having overlapping service areas are designated by various line types. Each PLMN 202, 204, 206 may be set up similar to a wireless communication system 100 as shown in FIG. 1. For ease of explanation, each PLMN 202, 204, 206 is represented by only a few communications cells 202a–c, 204a–c, 206a–c. However, in practice each PLMN is generally a much larger network of cells having several base transceiver stations and several BSCs. A mobile station 210 is shown in FIG. 1 as being in an area covered by PLMNs 202, 204, 206 by way of overlapping communication cells 202a, 204a, 206a. The mobile station 210 needs to discover available PLMNs and select a suitable PLMN for the type of service that the mobile station 210 will be using in its communication session (e.g., voice communication, real-time video communication, text messaging, Internet access, etc.). In searching for a suitable PLMN, the mobile station 210 considers each PLMN 202, 204, 206 as a potential communication network for the mobile station 210.

Each PLMN 202, 204, 206 may offer different classes-of-service having different bandwidth capabilities, where certain classes-of-services may not be supported by all PLMNS. For example, PLMN 202 may be a 3G network, such as UMTS CDMA2000 or W-CDMA, which may offer bandwidths of up to 2 Mbps. This allows communication services such as streaming video conferencing as well as most other types of services. PLMN 204 may be an EDGE network with a bandwidth capability of 384 Kbps. PLMN 204 may offer types of services such as Internet access and browsing, along with voice traffic and simple text messaging. PLMN 206 may be a High Speed Circuit Switched Data (HSCSD) network or GPRS network offering basic voice communications, text based email, text messages using the Short Message Standard (SMS) or other basic service types at a bandwidth of 56 Kbps. PLMN 206 would be unable to support services types such as video conferencing and Internet browsing due to bandwidth limitations.

As demonstrated, the bandwidth limitations among different PLMNs may vary depending on the type of network, though the types of services described are not necessarily limited to a particular bandwidth. For example, PLMN 204 having a bandwidth of 384 Kpbs may still be able to support video conferencing though to a lesser extent than PLMN 202, while PLMN 202 with a 2 Mbps bandwidth may also offer basic voice communications in addition to its high bandwidth services.

Furthermore, each PLMN 202, 204, 206 may offer guaranteed or non-guaranteed bandwidth. For example, circuit-switched networks such as HSCSD offer communication channel connections having a guaranteed bandwidth in each channel. In this case, the volume of traffic through a particular BTS is dependent on the number of communication channels the BTS offers such that the PLMN is limited by the number of channels. Most 3G systems on the other hand, utilize a packet-switching structure, such that all communications share a single large bandwidth. By default, these networks offer communications with a non-guaranteed bandwidth since all communications share the same bandwidth. Thus, the PLMN is limited by the amount of available bandwidth in the network which may vary based on the volume of traffic and the types of services required by each communication session.

However, it is possible to obtain a guaranteed bandwidth over a packet-switched network or the like. For example, bandwidth can be reserved in a packet-switched network by allocating or reserving resources, or by carrying traffic through private networks. The exact means of accomplishing this reservation of bandwidth can vary, such as utilizing a quality of service (QoS) manager or a bandwidth broker in the packet-switched network. Protocols to reserve this bandwidth may include, but are not limited to, the DIFFSERV protocol (i.e., Differentiated Services) from the Internet Engineering task Force (IETF) (RFC 2430, 2474, 2475, 2638, 2983, 3086).

DIFFSERV provides packet classification and specifies traffic classes. Resources, such as network routers, can easily sort packets based on their corresponding class of treatment. QoS managers and bandwidth brokers may track the quality of service requests of users and/or applications (e.g., communication sessions), and allocate resources by marking those resources as being allocated to a particular communication session. When communication sessions carry over to multiple PLMNs (e.g., the subscriber sending a transmission uses one PLMN and the receiving subscriber uses another PLMN), bandwidth brokers or QoS managers of each PLMN work together to guarantee appropriate bandwidth on each PLMN so there is no interruption in the communication session at either network due to unexpected bandwidth limitations. While the above have been given as examples of instruments that may be used to carry out establishing guaranteed bandwidth on a packet-switched network, other bandwidth reservation resources are also available, as known in the art.

Each PLMN 202, 204, 206 may define the type of class-of-service that each offers to the mobile station. Each class-of-service may support one or more types of services, as explained below. This information may be sent to the mobile station 210 by the PLMN as part of the system information. The PLMNs 202, 204, 206 may broadcast the system information with their respective class-of-service types in each of their communication cells 202a–c, 204a–c, 206a–c via the base transceiver stations. The following provides an example of different classes-of-service that may be offered, though this should not be construed as limiting the invention to any particular type of class-of-service.

1) Guaranteed Bandwidth, when requested, of at least 1 MB/s
2) Non-guaranteed Bandwidth when requested, of at least 1 MB/s
3) Guaranteed Bandwidth, when requested, of at least 384 Kbps
4) Non-guaranteed Bandwidth when requested, of at least 384 Kbps
5) Guaranteed Bandwidth, when requested, of at least 56 Kbps
6) Non-guaranteed Bandwidth when requested, of at least 56 Kbps
7) No guaranteed bandwidth available
8) Reserved Essentially, the examples of classes-of-service given above are defined by the bandwidth that is offered, and whether that bandwidth is guaranteed or non-guaranteed. Guaranteed bandwidths may be particularly important in high-bandwidth applications such as streaming video communication sessions. In order to avoid disruptions in the video due to additional traffic on the PLMN, the PLMN may offer guaranteed bandwidths to the mobile station 210. Each PLMN 202, 204, 206 is also able to specify if there is no guaranteed bandwidth available in its network whatsoever. Even if the PLMN may support guaranteed bandwidths, the provider may wish the guaranteed bandwidths to be used only by mobile stations that use the PLMN as a home PLMN. Therefore, the PLMN may broadcast the classes-of-service as not including guaranteed bandwidth for those mobile stations looking for a visited PLMN, but allow subscriber mobile stations to use the guaranteed bandwidth if the MCC and MNC matches. Redefined or future classes-of-service may also be accounted for by allocating a reserved generic class-of-service, not specific to any particular type of class-of-service. The PLMN may also define what classes-of-service it offers based on the volume of traffic that it is already carrying. For example, if there is a heavy volume of streaming video traffic, then PLMN may define the guaranteed and non-guaranteed 1 Mbps bandwidths as unavailable. If the traffic lightens up, those bandwidths may become available.

Referring to FIG. 3, each PLMN 202, 204, 206 may define the class(es)-of-service it offers in a code 302, 304, 306 that may be transmitted as part of the PLMN's system information. For example, this may be done in the synchronization channel of a CDMA channel. In the present embodiment, this could be a simple binary code one byte long where a single bit is used to specify the availability of a particular class-of-service. A '1' bit signifies that the class-of-service defined by that bit is offered.

For example, PLMN 202 has been described as a 3G network having up to a 2 Mbps bandwidth. However, PLMN 202 may not offer a guaranteed bandwidth of at least 1 Mbps. Therefore, PLMN 202 broadcasts its code 302 to all mobile stations in the area as '10111110' which according to FIG. 3 specifies that it is capable of offering a class-of-service of Non-Guaranteed Bandwidth of at least 1 Mbps or any lower class-of-service. PLMN 204, being an EDGE network, specifies its class-of-service as having no guaranteed bandwidths available, with non-guaranteed bandwidths of 56 Kbps and 384 Kbps as the only available non-guaranteed bandwidths (i.e., its code 304 is '11101000'). PLMN 206 broadcasts a code 306 of '10110000' to indicate it offers guaranteed and non-guaranteed bandwidths of 56 Kbps. The reserved bit is always set to '1' unless and until that bit is associated with a particular class-of-service. The byte-long definition used by the PLMNs has only been described as an example of how to define the available classes-of-service for the mobile station 210. The size of the code 302, 304, 306 may vary depending on the number of classes-of-service and the amount of space reserved for future definitions. Furthermore, the manner in which the PLMN transmits its available classes-of-service to the mobile may vary, as known by those in the art.

Referring again to FIG. 2, mobile station 210 is in an area serviced by communication cells 202a, 204a, 206a. This gives the mobile station 210 a choice between PLMNs 202, 204, 206 where each PLMN broadcasts its code specifying available classes-of-services. For purposes of this explanation, it is assumed that the mobile station 210 is initiating PLMN discovery or otherwise searching for a suitable PLMN. When the mobile station 210 initiates PLMN discovery it is able to detect the various PLMNs 202, 204, 206 that are available. The mobile station 210 then selects a suitable PLMN based on the class-of-service required by the mobile station 210.

The required class-of-service may be represented by a code 310 in the mobile station 210 having a similar format as the code 302, 304, 306 broadcast by the PLMNs 202, 204, 206. For example, the subscriber to the mobile station 210 may need a PLMN capable of streaming video (e.g., a guaranteed bandwidth of at least 384 Kbps). Therefore, the mobile station 210 may have a required class-of-service code 310 of '10000101' meaning that the mobile station 210 can use a PLMN supporting a guaranteed bandwidth of 384 Kpbs. A 25 non-guaranteed bandwidth of any size may not be desirable for video conferencing, so the required class-of-service code 310 uses a '1' in the no guaranteed bandwidths field to automatically discard any PLMNs that do not offer any guaranteed bandwidths. In addition, the required code 310 is set to discard any bandwidth less than 384 Kbps. Based on the defined classes-of-service, the required code 310 is set up such that the mobile station 210 will only accept a guaranteed bandwidth of at least 384 Kbps and a guaranteed bandwidth of 1 Mbps.

The required class(es)-of-service for the mobile station 210 may be based on a variety of factors, such as the type(s) of communication sessions the mobile station 210 is designed for. For example, 3G compliant mobile stations 210 may always want to connect to a PLMN having a minimum bandwidth of 384 Kbps regardless of the type of communication. The type(s) of communication the subscriber is about to make may also determine the required class-of-service. In such a case, the subscriber may tell the mobile station 210 that it will be used for a video conference, and the mobile station 210 may automatically load the corresponding class-of service code.

Alternatively, the required class-of-service of the mobile station 210 may vary depending on the type of communication session or based on the mobile station's situation. For example, in EDGE systems a mobile station is only expected to be able to communicate at 384 Kbps if it is stationary or moving at pedestrian speed. If the mobile station 210 is moving faster than pedestrian speed, then the connection speed is lowered to 144 Kbps. Therefore, the mobile station 210 may look for a PLMN to be optimized to the connectivity of the mobile station 210 based on the mobile station's current needs. Once those requirements change, the mobile station may look for a new PLMN by updating its required class-of-service code.

Figure 4:
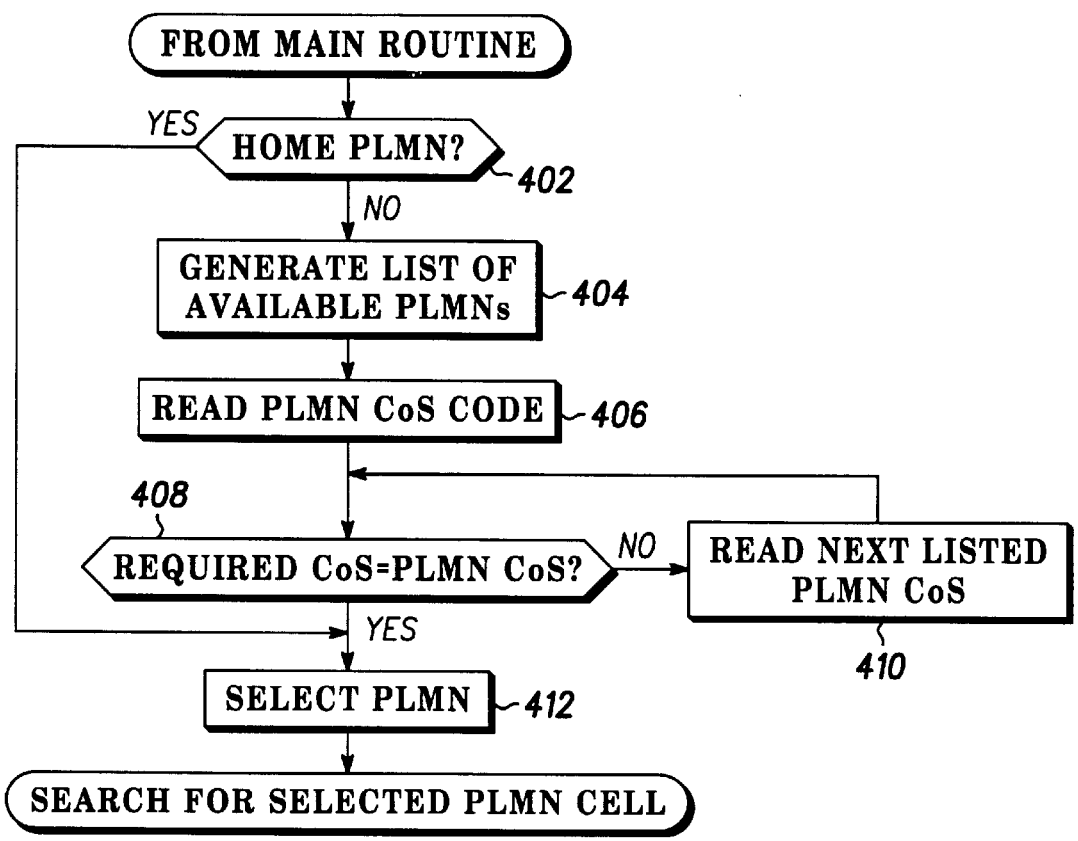
FIG. 4 is a flowchart depicting the steps performed in selecting a wireless communication network in accordance with an embodiment of the invention.

Referring to FIG. 4, the mobile station 210 performs a routine 400 to compile a list of PLMNs and make a suitable selection based on the class-of-service required by the mobile station 210. For example, the mobile station 210 may be a 3G mobile station capable of streaming video communication sessions. The routine 400 may be initiated based on any factor that may cause the mobile station 210 to search for a PLMN, such as roaming, power-up, periodic check, etc. At block 402, the mobile station may initially determine if it can use its home PLMN by matching MCCs and MNCs, as described above. It is expected that the home PLMN would be able to already support the class-of-service required by the mobile station 210, so the mobile station 210 would attempt to contact its home PLMN first. However, this is not required.

If the home PLMN is unavailable, at block 404 the mobile station 210 may compile a list of potential visited PLMNs that are available. The list may be generated based on those PLMNs that offer sufficient signal strength beyond a certain threshold, as is known in the art. The list may also prioritize the available PLMNs based on signal strength. Thus, PLMN signal strength may still be factored into the selection, and may be used as the deciding factor should the mobile station 210 discover two or more PLMNs of otherwise equal capabilities Alternatively, the mobile station 210 may forego the compilation of a list and simply examine each PLMN and its class-of-service code as it is detected. If the PLMN is insufficient, the mobile station 210 may continue searching. If the PLMN is sufficient, the mobile station 210 may store the PLMN or compare it to the current PLMN and continue with the PLMN that offers the better service.

Once the mobile station 210 has a list of potential PLMNs, the mobile station 210 reads the class-of-service (CoS) code of each PLMN on the list at block 406, and attempts to match up a PLMN CoS with the required CoS of the mobile station 210 at block 408. The comparison process at block 408 does not need to look for an exact match. For example, referring again to FIG. 2, the required CoS of the mobile station 210 does not perfectly match up with the CoS of any of the PLMNs in FIG. 3. However, the CoS of the mobile station 210 is only specifying minimum requirements. Even though none of the PLMNs 202, 204 or 206 offer a guaranteed bandwidth of 1 Mbps, PLMN 202 offers a guaranteed bandwidth of 384 Kbps, which is suitable for the purposes of the mobile station 210. Alternatively, if PLMN 202 offered a guaranteed bandwidth of at least 1 Mbps, the mobile station 210 may either store PLMNs 202, 204 as each being a potential PLMN or select one over the other. The decision between two viable PLMN choices is described further below.

If there is no match between the CoS of the mobile station 210 and the PLMN as determined at block 408, the routine 400 looks at the CoS of the next PLMN on the list at block 410. The mobile station 210 may continue this routine 400 until it finds a match between the required class-of-service code and the available class-of-service code of the PLMN. Once a suitable PLMN is found, at block 412 the mobile station 210 selects the PLMN and may continue on with searching for the closest BTS of the PLMN.

The selection process 412 may be automatically performed by the mobile station 210, or the mobile station 210 may offer this PLMN as an option to the subscriber who may decide to use that PLMN or to search for another PLMN. The mobile station 210 may also compile a list of PLMNs that match the required CoS and automatically select one based on certain criteria (e.g., strongest signal, guaranteed over non-guaranteed bandwidth, highest bandwidth, etc.). Alternatively, the mobile station 210 may offer the subscriber either the overall list of PLMNs as compiled at block 404 or a list of those PLMNs that have suitable classes-of-service as determined at block 408. The subscriber may then manually select a desired PLMN from the list. In yet a further example, the mobile station may select between multiple PLMNs each having a sufficient class(es)-of-service, but by default always decide to choose the PLMN having a higher bandwidth, or a guaranteed bandwidth. The mobile station 210 may also select the PLMN based on what would be the most efficient use of resources (e.g., most closely match the bandwidth requirements of the mobile station 210).

While the required class-of-service for the mobile station 210 has been described with respect to the minimum requirements of the mobile station 210, the required CoS may also be determined based on the most efficient use of resources. For example, if the mobile station is only to be used for voice communications, it only needs a connection speed of 56 Kbps. To use a guaranteed bandwidth of 384 Kbps or 1 Mbps for a 56 Kbps transmission would be a waste of resources. Therefore, mobile station 210 may have a required CoS that causes the routine to ignore PLMNs that only offer guaranteed bandwidths higher than 56 Kbps.

In addition to initially searching for a suitable PLMN, for example when moving into a new registration area or powering up, the mobile station may also use the routine 400 to continually search for new PLMNs that may be more suitable for the mobile station 210. The mobile station 210 may continue to search for its home PLMN, a PLMN that offers better resources, a PLMN that offers more efficient use of its resources based on the mobile station's requirements, etc. Upon detecting a new PLMN, the mobile station 210 may compare its required class-of-service to the class(es)-of-service offered by the new PLMN. If the new PLMN offers a closer match to the required class-of-service than the PLMN currently being used (e.g., more efficient use of resources, higher bandwidth, etc.), the mobile station 210 may then lock onto the new PLMN or offer the new PLMN as an option for the subscriber to choose.

The mobile station 210 may also be able to learn what providers and/or applications the subscriber prefers, so that it may automatically search and connect with those preferred PLMNs and/or class(es)-of-service. Thus, the mobile station 210 may lock onto a desired network based on its bandwidth requirements, while taking into account what is the most efficient use of bandwidth resources of the PLMN. This frees up resources on the chosen PLMN for other mobile stations having different bandwidth requirements.

While the present invention has been described with reference to specific examples, which are intended to be illustrative only, and not to be limiting of the invention, it will be apparent to those of ordinary skill in the art that changes, additions and/or deletions may be made to the disclosed embodiments without departing from the spirit and scope of the invention.

What is claimed is:

1. A method of selecting a wireless communication network each having one or more base transceiver stations, comprising:
   receiving a first signal from a first base transceiver station of a first wireless communication network, wherein the first signal is indicative of one or more communication service types offered by the first wireless communication network, wherein the first wireless communication network is a public land mobile network (PLMN);
   receiving a second signal from a second base transceiver station of a second wireless communication network, wherein the second signal is indicative of one or more communication service types offered by the second wireless communication network, wherein the second wireless communication network is a public land mobile network (PLMN), the first and second signals received during a public land mobile network discovery initiated by a mobile station, and
   selecting one of the first and second wireless communication networks based at least in part on a degree of match that provides the closest match between the offered communication service types and communication service types required by the mobile station.

2. A method as defined in claim 1, wherein the offered communication service types are defined by at least one of bandwidth size, guaranteed bandwidth and non-guaranteed bandwidth.

3. A method as defined in claim 1, wherein the first and second signals are received as part of the wireless communication network system information.

4. A method as defined in claim 1, wherein selecting one of the first and second wireless communication networks is further based at least in part on a signal strength of each of the first and second signals.

5. A method as defined in claim 1, wherein selecting one of the first and second wireless communication networks is further based at least in part on the most efficient use of communication resources of the first and second wireless communication networks.

6. A method as defined in claim 1, wherein the required communication service types are the minimum communication service types required by the mobile station, and wherein selecting one of the first and second wireless communication networks is further based at least in part on communication service types preferred by a user of the mobile station.

7. A method as defined in claim 6, wherein selecting one of the first and second wireless communication networks comprises selecting a wireless communication network that provides the closest match between the offered communication service types and the preferred communication service types.

8. A method of selecting a communication network comprising:
   connecting to a first wireless communication network having one or more offered communication service types, wherein the first wireless communication network is a public land mobile network (PLMN);
   evaluating a first degree of match between the offered communication service types of the first wireless communication network and one or more communication service types required by a mobile station;
   receiving a signal from a base transceiver station of a second wireless communication network during the same public land mobile network discovery corresponding to the connecting to the first wireless network, the second wireless communication network being a public land mobile network (PLMN), wherein the signal is indicative of one or more communication service types offered by the second wireless communication network;
   comparing the offered communication service types of the second network to the communication service types required by the mobile station;
   and connecting to the second network if the offered communication service types of the second network provides a closer degree of match to the communication service types required by the mobile station than the first degree of match.

9. A method as defined in claim 8, wherein the offered communication service types are defined by at least one of bandwidth size, guaranteed bandwidth and non-guaranteed bandwidth.

10. A method as defined in claim 8, wherein the signal is received as part of the system information of the second wireless communication network.

11. A method as defined in claim 8, wherein connecting to the second wireless communication networks is further based at least in part on a signal strength of the signal.

12. A method as defined in claim 8, wherein connecting to the second wireless communication network is further based at least in part on the most efficient use of communication resources of the first and second wireless communication networks.

13. A method as defined in claim 8, wherein the required communication service types are the minimum communication service types required by the mobile station, and wherein connecting to the second wireless communication network is further based at least in part on communication service types preferred by a user of the mobile station.

14. In a mobile station, wherein the mobile station is capable of communicating with one or more base transceiver stations within one or more wireless communication networks, the wireless communication networks being public land mobile networks, wherein the mobile station requires one or more communication service types, and wherein the mobile station operates in accordance to a logic circuit for enabling selection of a wireless communication network, the logic circuit comprising:
   a first logic that directs the logic circuit to initiate reception of a first signal from a first base transceiver station of a first wireless communication network at a time of public land mobile network discovery, wherein the first signal is indicative of one or more communication service types offered by the first wireless communication network;
   a second logic that directs the logic circuit to initiate reception of a second signal from a second base transceiver station of a second wireless communication network during the same mobile station-initiated network discovery as receiving the first signal, wherein the second signal is indicative of one or more communication service types offered by the second wireless communication network;
   a third logic that directs the logic circuit to select one of the first and second wireless communication network based at least in part on one or more of the following: the wireless communication network that provides the closet match between the offered communication services types and the required communication service types; and communication service types preferred by a user of the mobile station, wherein the required communication service types are the minimum communication service types required by the mobile station.

15. A logic circuit as defined in claim 14, wherein the third logic comprises a logic that directs the logic circuit to select one of the first and second wireless communication networks based at least in part on one or more of the following: a signal strength of each of the first and second signals; the most efficient use of communication resources of the first and second wireless communication networks; and communication service types required by a mobile station.

* * * * *

UNITED STATES PATENT AND TRADEMARK OFFICE
CERTIFICATE OF CORRECTION

PATENT NO. : 6,799,038 B2
DATED : September 28, 2004
INVENTOR(S) : Venkat Gopikanth It is certified that error appears in the above-identified patent and that said Letters Patent is hereby corrected as shown below:

Column 10,
Line 26, please delete "networks" and insert -- network --.
Line 64, please delete "network" and insert -- networks --.

Column 11,
Line 1, please delete "closet" and insert -- closest --.

Signed and Sealed this

Twenty-second Day of March, 2005

JON W. DUDAS
*Director of the United States Patent and Trademark Office*